(12) United States Patent
Albsmeier et al.

(10) Patent No.: US 9,219,294 B2
(45) Date of Patent: Dec. 22, 2015

(54) POWER MANAGEMENT SYSTEM THAT CHANGES THE OPERATING CONDITIONS OF A BATTERY CHARGER

(76) Inventors: Eric D. Albsmeier, Sheboygan, WI (US); Richard A. Mauk, Sheboygan, WI (US); Harrison C. Chiu, Grafton, WI (US)

( * ) Notice: Subject to any disclaimer, the term of this patent is extended or adjusted under 35 U.S.C. 154(b) by 334 days.

(21) Appl. No.: 13/591,595

(22) Filed: Aug. 22, 2012

(65) Prior Publication Data

US 2014/0055081 A1   Feb. 27, 2014

(51) Int. Cl.

| | | |
|---|---|---|
| *H02J 7/00* | (2006.01) | |
| *H01M 10/44* | (2006.01) | |
| *H02J 13/00* | (2006.01) | |
| *H01M 10/42* | (2006.01) | |

(52) U.S. Cl.
CPC ............ *H01M 10/44* (2013.01); *H01M 10/441* (2013.01); *H02J 13/0013* (2013.01); *H01M 2010/4271* (2013.01); *H02J 2007/0096* (2013.01); *Y02T 10/7077* (2013.01)

(58) Field of Classification Search
CPC ................. H02J 7/00; H02J 7/14; H02J 3/02; H02J 7/04; H02J 13/0013; H02J 2007/0096; H01M 10/44; H01M 10/441; H01M 2010/4271; Y02T 10/7077
See application file for complete search history.

(56) References Cited

U.S. PATENT DOCUMENTS

| | | | |
|---|---|---|---|
| 1,095,967 | A | 5/1914 | Lister |
| 1,660,397 | A | 2/1928 | Sayles |
| 1,898,370 | A | 2/1933 | Hughes et al. |
| 2,152,405 | A | 3/1939 | Dreischerf |
| 2,564,957 | A | 8/1951 | William |
| 2,692,953 | A | 10/1954 | Markett, Jr. |
| 2,729,750 | A | 1/1956 | Owen |
| 2,772,385 | A | 11/1956 | Kenneth et al. |
| 2,866,907 | A | 12/1958 | William |
| 3,108,190 | A | 10/1963 | Gebhard |
| 3,484,681 | A | 12/1969 | Grady, Jr. |

(Continued)

FOREIGN PATENT DOCUMENTS

| | | |
|---|---|---|
| CA | 2213018 C | 5/2001 |
| DE | 102008051078 A1 | 4/2009 |

(Continued)

OTHER PUBLICATIONS

"European Application Serial No. 13180339.7, European Search Report dated Dec. 4, 2013", 8 pgs.

(Continued)

*Primary Examiner* — Nha Nguyen
(74) *Attorney, Agent, or Firm* — Schwegman Lundberg & Woessner, P.A.

(57) ABSTRACT

Some embodiments relate to a power management system. The power management system includes a generator that provides a voltage output to a bus. The bus is adapted to be connected to a load. The power management system further includes a battery charger that is adapted to charge a battery. A generator controller operates the generator and also adjusts operating conditions of the battery charger. In some embodiments, the generator includes an internal combustion engine that drives an alternator. Embodiments are contemplated where the battery charger is adapted to receive power from a primary power source. As an example, the primary power source may be utility power or some other form of generator power.

17 Claims, 3 Drawing Sheets

(56) References Cited

U.S. PATENT DOCUMENTS

| | | |
|---|---|---|
| 3,616,872 A | 11/1971 | Taylor |
| 3,646,356 A | 2/1972 | Hoffman |
| 3,696,283 A | 10/1972 | Ackley |
| 3,720,839 A | 3/1973 | Spahr |
| 3,835,362 A | 9/1974 | Greene |
| 3,874,472 A | 4/1975 | Deane |
| 3,890,556 A | 6/1975 | Melling et al. |
| 3,904,947 A | 9/1975 | Crews |
| 3,917,017 A | 11/1975 | Deane |
| 3,949,289 A | 4/1976 | Day |
| 4,019,111 A | 4/1977 | Bennefeld |
| 4,052,656 A | 10/1977 | Lavell et al. |
| 4,058,759 A | 11/1977 | Halfhill |
| 4,081,738 A | 3/1978 | Roller |
| 4,082,992 A | 4/1978 | Day |
| 4,156,836 A | 5/1979 | Wiley |
| 4,161,682 A | 7/1979 | Corvette |
| 4,309,644 A | 1/1982 | Reimers et al. |
| 4,314,193 A | 2/1982 | Mortonson |
| 4,336,485 A | 6/1982 | Stroud |
| 4,345,197 A | 8/1982 | Wheadon et al. |
| 4,346,338 A | 8/1982 | Nakamoto et al. |
| 4,347,473 A | 8/1982 | Stroud |
| 4,348,628 A | 9/1982 | Loucks |
| 4,348,629 A | 9/1982 | Sievers |
| 4,361,796 A | 11/1982 | Akita et al. |
| 4,396,880 A | 8/1983 | Windebank |
| 4,488,198 A | 12/1984 | Christen et al. |
| 4,604,565 A | 8/1986 | Yokota et al. |
| 4,616,162 A | 10/1986 | Radomski |
| 4,636,706 A | 1/1987 | Bowman et al. |
| 4,757,249 A | 7/1988 | Farber et al. |
| 4,829,228 A | 5/1989 | Buetemeister |
| 5,002,840 A | 3/1991 | Klebenow et al. |
| 5,097,194 A | 3/1992 | Walton et al. |
| 5,122,722 A | 6/1992 | Goedken et al. |
| 5,166,596 A | 11/1992 | Goedken |
| 5,204,610 A | 4/1993 | Pierson et al. |
| 5,206,579 A | 4/1993 | Kawate et al. |
| 5,233,229 A | 8/1993 | Kohl et al. |
| 5,254,936 A | 10/1993 | Leaf et al. |
| 5,316,868 A | 5/1994 | Dougherty et al. |
| 5,325,497 A | 6/1994 | Jaffe et al. |
| 5,420,493 A | 5/1995 | Hargadon et al. |
| 5,422,517 A | 6/1995 | Verney et al. |
| 5,438,225 A | 8/1995 | Berger |
| 5,488,283 A | 1/1996 | Dougherty et al. |
| 5,504,416 A | 4/1996 | Holloway et al. |
| 5,659,240 A | 8/1997 | King |
| 5,689,174 A | 11/1997 | Pacheco, Sr. |
| 5,803,215 A | 9/1998 | Henze et al. |
| 5,844,325 A | 12/1998 | Waugh et al. |
| 5,850,136 A | 12/1998 | Kaneko |
| 5,977,744 A | 11/1999 | Williams et al. |
| 5,986,431 A | 11/1999 | Hayes |
| 6,127,798 A | 10/2000 | Lansang et al. |
| 6,204,632 B1 | 3/2001 | Nierescher et al. |
| 6,215,277 B1 | 4/2001 | Renehan |
| 6,215,282 B1 | 4/2001 | Richards et al. |
| 6,222,343 B1 | 4/2001 | Crisp et al. |
| 6,229,279 B1 | 5/2001 | Dierker |
| 6,275,001 B1 | 8/2001 | Dierker |
| 6,331,761 B1 | 12/2001 | Kumar et al. |
| 6,333,619 B1 | 12/2001 | Chavez et al. |
| 6,466,024 B1 | 10/2002 | Rogers |
| 6,734,651 B2 | 5/2004 | Cook et al. |
| 6,801,014 B1 * | 10/2004 | Chitsazan et al. ............ 320/119 |
| 6,815,931 B1 | 11/2004 | Wells et al. |
| 6,831,464 B2 | 12/2004 | Yang |
| 6,924,621 B2 | 8/2005 | Jabaji et al. |
| 6,930,469 B2 | 8/2005 | Krieger et al. |
| 7,061,138 B2 | 6/2006 | Richter |
| 7,061,209 B2 | 6/2006 | Mori |
| 7,164,214 B2 | 1/2007 | Eisenberger et al. |
| 7,189,125 B2 | 3/2007 | Okuyama |
| 7,208,915 B2 | 4/2007 | Kubota et al. |
| 7,235,898 B1 | 6/2007 | Jones, III et al. |
| 7,456,611 B2 | 11/2008 | Mullett et al. |
| 7,570,011 B2 | 8/2009 | Waikar et al. |
| 7,573,145 B2 | 8/2009 | Peterson |
| 7,591,331 B2 | 9/2009 | Glonner et al. |
| 7,642,753 B2 | 1/2010 | Simpson et al. |
| 7,855,466 B2 | 12/2010 | Bax |
| 7,872,362 B2 | 1/2011 | Kato et al. |
| 7,884,502 B2 | 2/2011 | Lyman et al. |
| 7,999,405 B2 | 8/2011 | Peterson |
| 8,004,110 B2 | 8/2011 | Kouwa |
| 8,022,572 B2 | 9/2011 | Vyas et al. |
| 8,076,900 B1 | 12/2011 | Brown |
| 8,169,755 B2 | 5/2012 | Sugita |
| 8,314,587 B2 | 11/2012 | White et al. |
| 8,354,818 B2 | 1/2013 | Louch et al. |
| 8,441,228 B2 | 5/2013 | Brabec |
| 8,749,193 B1 | 6/2014 | Sullivan |
| 8,829,855 B2 | 9/2014 | Albsmeier et al. |
| 2003/0122360 A1 | 7/2003 | Badr et al. |
| 2004/0164709 A1 | 8/2004 | Kapsokavathis et al. |
| 2004/0189254 A1 | 9/2004 | Kapsokavathis et al. |
| 2005/0189923 A1 | 9/2005 | Ohishi et al. |
| 2005/0275372 A1 | 12/2005 | Crowell |
| 2006/0055377 A1 | 3/2006 | Okubo et al. |
| 2007/0276547 A1 | 11/2007 | Miller |
| 2008/0136371 A1* | 6/2008 | Sutardja ........................ 320/109 |
| 2008/0231117 A1 | 9/2008 | Bucur et al. |
| 2009/0039705 A1 | 2/2009 | Lyman et al. |
| 2010/0052614 A1* | 3/2010 | Mariels ......................... 320/116 |
| 2010/0253290 A1 | 10/2010 | Hammerstrom |
| 2011/0018340 A1 | 1/2011 | Patterson |
| 2011/0084650 A1 | 4/2011 | Kaiser et al. |
| 2011/0101778 A1 | 5/2011 | Yang |
| 2011/0175357 A1 | 7/2011 | Navetta |
| 2011/0215641 A1 | 9/2011 | Peterson et al. |
| 2011/0227537 A1 | 9/2011 | Maleus |
| 2011/0241611 A1 | 10/2011 | Watanabe et al. |
| 2011/0281679 A1 | 11/2011 | Larrabee et al. |
| 2011/0291621 A1* | 12/2011 | Iles et al. ...................... 320/145 |
| 2012/0074893 A1 | 3/2012 | Cole |
| 2012/0095612 A1* | 4/2012 | Rivers et al. .................. 700/297 |
| 2012/0112702 A1 | 5/2012 | Steigerwald et al. |
| 2012/0139486 A1 | 6/2012 | Holland |
| 2012/0175876 A1* | 7/2012 | Pendray et al. ................. 290/41 |
| 2012/0239214 A1 | 9/2012 | Nakashima et al. |
| 2012/0256483 A1 | 10/2012 | Nakashima et al. |
| 2013/0073126 A1 | 3/2013 | Kumar et al. |
| 2014/0070760 A1 | 3/2014 | Albsmeier et al. |
| 2014/0084598 A1 | 3/2014 | Albsmeier et al. |
| 2014/0210401 A1 | 7/2014 | Di Cristofaro |

FOREIGN PATENT DOCUMENTS

| | | |
|---|---|---|
| EP | 1568533 A1 | 8/2005 |
| JP | 06-022503 A | 1/1994 |
| JP | 06022503 A | 1/1994 |
| JP | 01-117629 A | 5/1998 |
| JP | 01117629 A | 5/1998 |
| JP | 2000-308208 A | 11/2000 |
| JP | 2003-155968 A | 5/2003 |
| JP | 2005-264860 A | 9/2005 |
| JP | 2005-0264860 A | 9/2005 |
| JP | 2012-147633 A | 8/2012 |
| JP | 2012147633 | 8/2012 |
| KR | 101132770 B1 | 4/2012 |
| WO | WO-2008/070163 A2 | 6/2008 |
| WO | WO-2011/088450 A2 | 7/2011 |

OTHER PUBLICATIONS

"European Application Serial No. 13183671.0, European Search Report mailed Jan. 31, 2014", 11 pgs.

U.S. Appl. No. 13/627,056, Non Final Office Action mailed Feb. 28, 2014, 11 pgs.

"European Application Serial No. 13182040.9, European Search Report mailed Feb. 3, 2014", 11 pgs.

(56) References Cited

OTHER PUBLICATIONS

"U.S. Appl. No. 13/606,488, Non Final Office Action mailed Nov. 13, 2014", 29 pgs.

"U.S. Appl. No. 13/627,056, Notice of Allowance mailed May 27, 2014", 8 pgs.

"U.S. Appl. No. 13/627,056, Response filed May 15, 2014 to Non Final Office Action mailed Feb. 28, 2014", 8 pgs.

"DC Generator and Battery Charger for marine and mining remote sites", American Power Systems, Inc.; [Online]. Retrieved from the Internet: <http://www.americanpowerinc.com/dc%20gen.htm>, (2011), 3 pgs.

U.S. Appl. No. 13/606,488, Examiner Interview Summary mailed Jun. 29, 2015, 4 pgs.

U.S. Appl. No. 13/606,488, Non Final Office Action mailed Apr. 27, 2015, 46 pgs.

U.S. Appl. No. 13/606,488, Response filed Jul. 15, 2015 to Non Final Office Action mailed Apr. 27, 2015, 9 pgs.

Chinese Application Serial No. 201310392335.8, Office Action mailed Apr. 3, 2015, (w/ English Summary), 9 pgs.

Chinese Application Serial No. 201310430572.9, Office Action mailed Mar. 2, 2015, (w/ English Summary), 9 pgs.

"Electropaedia (State of Charge (SOC) Determination", Electropaedia, mpoweruk, [Online]. Retrieved from the Internet: <web.archive.org/web/20080509145838/http://www.mpoweruk.com/soc.htm),>, (Apr. 9, 2015), 5 pgs.

"Engine—Definition from Merriam Webster Online Dictionary", [online]. Retrieved from the Internet: <https://web.archive.org/web/20090425162817/http://www.merriam-webster.com/dictionary/engine>, (Apr. 14, 2015), 2 pgs.

European Application Serial No. 13183671.0, Response filed Oct. 1, 2014 to European Search Report mailed Jan. 31, 2014, 22 pgs.

"Greenwood Car Show needs Volunteers", Doree, [online]. Retrieved from the Internet:<http://www.phinneywood.com/2009/06/page/7/>, (Apr. 15, 2015), 8 pgs.

"Starting and Charging", Firestone, [online]. Retrieved from the Internet<https://web.archive.org/web/20120301011512/http://m.fcacmobile.com/auto_service/starting_and_charging>, (Apr. 15, 2015), 2 pgs.

"Application Serial No. 13/606,488, Response filed Feb. 9, 2015 to Non Final Office Action mailed Nov. 13, 2014", 10 pgs.

"Chinese Application Serial No. 201310361761.5, Office Action mailed Apr. 3, 2015", (w/ English Translation), 11 pgs.

"European Application Serial No. 13180339.7, Response filed Aug. 19, 2014 to Office Action mailed Dec. 16, 2013", 16 pgs.

"European Application Serial No. 13182040.9, Response filed Sep. 10, 2014 to European Search Report mailed Feb. 3, 2014", 12 pgs.

"European Application Serial No. 13183671.0, Response filed Oct. 1, 2014 to European Search Report mailed Jan. 31, 2014", 22 pgs.

"U.S. Appl. No. 13/606,488, Final Office Action mailed Sep. 1, 2015", 36 pgs.

"Battery keeps dying", 88 Cutty Classic, OldsPower.com, [online]. [retrieved on Jul. 29, 2015]. Retrieved from the Internet: <http://www.oldspower.com/vb/showthread.php?t=52200>, (Mar. 9, 2010), 3 pgs.

"Effects of AC Ripple Current on VRLA Battery Life", Emerson Network Power, [online]. [retrieved Jul. 1, 2015] Retrieved from the Internet: <http://www.emersonnetworkpower.com/documentation/enus/brands/liebert/documents/white%20papers/effects%20of%020ac%20ripple%20current%20on%20vrla%20battery%20life.pdf>, (2009 & 2010), 8 pgs.

Khanna, Bhishm, "What is the difference between Diesel Engine and External Combustion Engine", Preserve Article, saved to Wayback Machine Internet Archive Oct 19 2011, [online]. [retrieved on Aug. 21, 2015]. Retrieved from the Internet: <http://web.archive.org/web/20111019102913/http://www.preservearticles.com/201012302049/difference-between-diesel-engineand-extern>, (Dec. 30, 2010), 4 pgs.

\* cited by examiner

POWER MANAGEMENT SYSTEM THAT CHANGES THE OPERATING CONDITIONS OF A BATTERY CHARGER

TECHNICAL FIELD

Embodiments pertain to a power management system, and more particularly to a power management system that changes the operating conditions of a battery charger.

BACKGROUND

Power management systems are used to selectively provide power to various types of power consuming loads. Some power management systems include batteries that are used to start engines and/or generators within the power management system.

The batteries in such conventional power management systems are typically either charged by a primary power or a secondary power source (e.g., the generator) when the primary power source becomes unavailable. These types of systems typically include a battery charger that charges the batteries according to a variety of charging profiles.

One of drawbacks with some of the battery chargers in existing power management systems is that they operate independently of the rest of the power management system. Therefore, the battery chargers provide no feedback to other controls in the power management system limiting the ability of such power management system to operate efficiently and cooperatively.

Another drawback with existing power management systems is that users are unable to adequately monitor the status/health of any of the batteries that are connected to the battery charger. Therefore, the batteries may become unable to start the engine/generator over time due to battery neglect or wear. In addition, since the battery chargers operate independently, users are often unable to respond to situations when the battery has become unsuitable.

Therefore, a need exists for a power management system that is able to monitor and interact with the battery chargers that are included in the power management systems. In addition, the power management system should be able to adjust the charging profile of any battery chargers that are included in the power management system based on data received from other components in the power management system.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
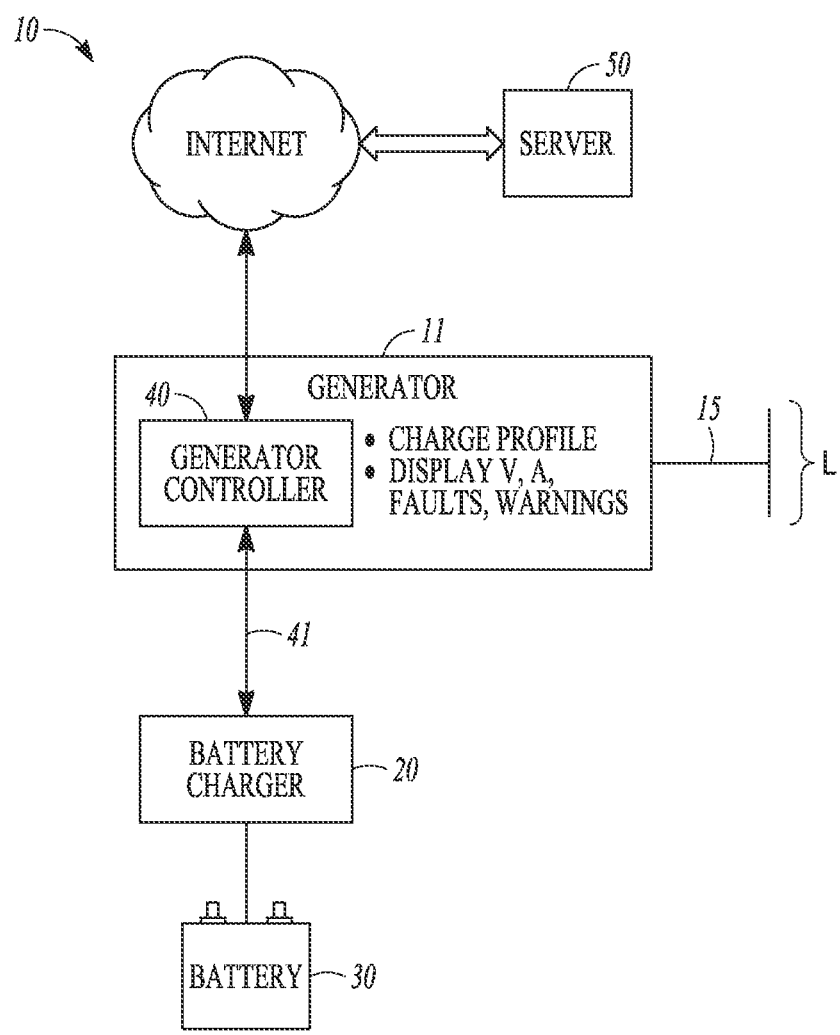
FIG. 1 is a functional block diagram illustrating an example power management system that includes a generator controller which adjusts operating conditions of a battery charger.

FIG. 1 is a functional block diagram illustrating an example power management system 10. The power management system 10 includes a generator 11 that provides a voltage output to a bus 15. The bus 15 is adapted to be connected to a load L.

The power management system 10 further includes a battery charger 20 that is adapted to charge a battery 30. A generator controller 40 operates the generator 11 and also adjusts operating conditions of the battery charger 20.

In some embodiments, the generator 11 includes an internal combustion engine that drives an alternator. It should be noted that other types of generators (i.e., power generation devices) are contemplated without departing from the scope of the invention.

Embodiments are contemplated where the battery charger 20 is adapted to receive power from a primary power source (not shown), As an example, the primary power source may be utility power or some other form of generator power.

In some embodiments, the generator controller 40 displays information relating to a charge level of the battery 30. As an example, the generator controller 40 may display the charging profile that is currently being used by the battery charger 20 to charge the battery 30 (among other operating parameters that are associated with the battery charger 20).

As another example, the generator controller 40 may display the voltage, current and/or temperature at the battery terminals (or some other part of the battery). As yet another example, the generator controller 40 may display faults, warnings and/or other conditions relating to the health of the battery 30 and/or battery charger 20.

In the illustrated example embodiments, the battery charger 20 and generator controller 40 are not located within the same enclosure, it should be noted embodiments are contemplated where the battery charger 20 and generator controller 40 are located within the same enclosure.

As shown in FIG. 1, the battery charger 20 and generator controller 40 exchange data via a communication bus 41 that is connected to the generator controller 40 and the battery charger 20. It be noted that the battery charger 20 and generator controller 40 may exchange data wirelessly.

In the illustrated example embodiments, the power management system 10 further includes a server 50 that is connected to the generator controller over a network (e.g., the Internet, a local network and/or wireless forms of communication). In some embodiments, the server 50 (i) stores information relating to the charge level of the battery 30; (ii) the operation of the power management system 10; and/or (iii) stores information relating to charge profiles that may be utilized by the battery charger 20.

It should be noted that the server 50 may provide commands to the generator controller 40 as to how to adjust the charging profile of the battery charger 20. As an example, data relating to preferred charging profiles for different types of batteries can be added to the server 50 such that the server 50 may be able to provide commands to the generator controller 40 to instruct the battery charger 20 to use an appropriate charging profile for a particular type of battery 30. In addition, a user may interact with the server 50 (or directly with the generator controller 40) to specify a charging profile based on some external condition (e.g., temperature).

In some embodiments, the generator controller 40 may adjust the charging profile utilized by the battery charger 20 in order to increase energy efficiency associated with operating the battery charger 20 when the battery charger receives power from a primary power source. As an example, the generator controller 40 may adjust the charging profile by turning off the battery charger 20 to increase energy efficiency associated with operating the battery charger 20 when the battery charger 20 receives power from a primary power source.

Figure 2:
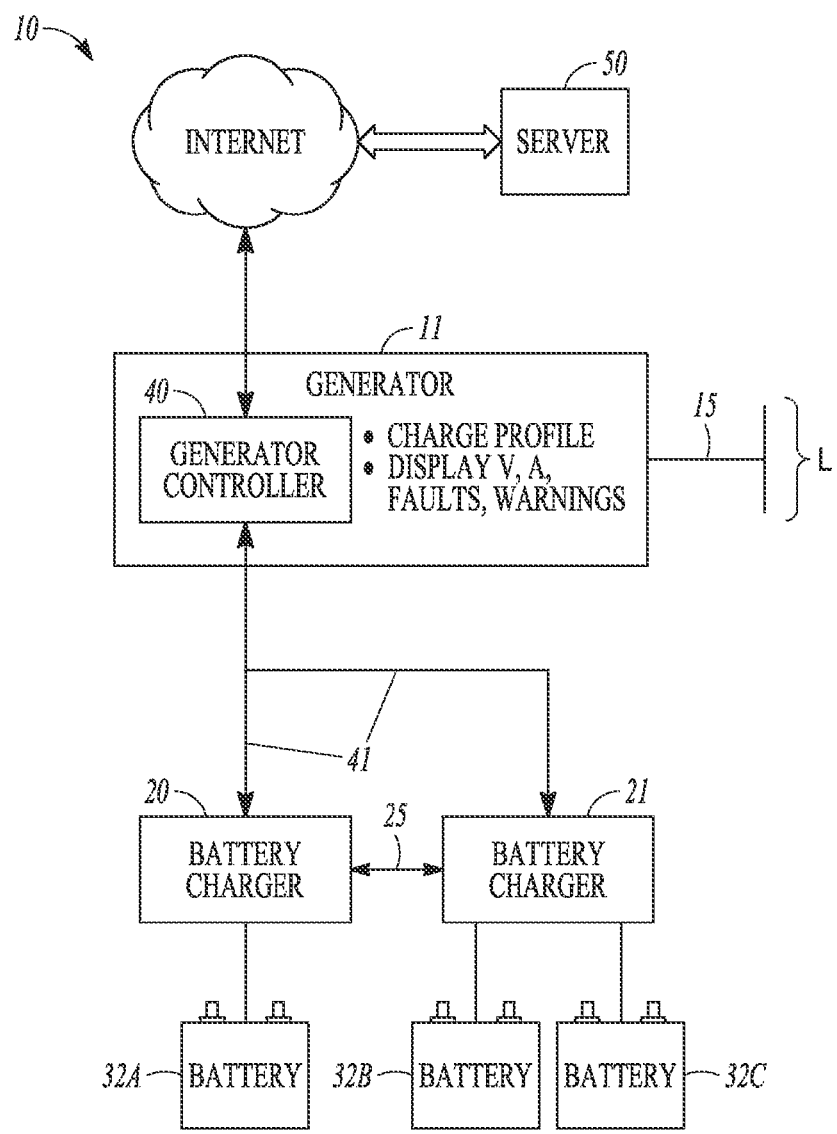
FIG. 2 is a functional block diagram similar to FIG. 1 where the generator controller adjusts operating conditions of a plurality of battery chargers.

FIG. 2 shows an example embodiment of the power management system 10 where the battery charger 20 is part of a plurality of battery chargers 20, 21 such that the generator controller 40 adjusts operating conditions of at least one of the battery chargers 20, 21. It should be noted that although only two battery chargers 20, 21 are shown in FIG. 2, any number of battery chargers may be included in the power management system 10.

In the illustrated example embodiment, each battery charger 20, 21 exchanges data with the other battery charger 20, 21 in order to adjust operating conditions of at least one of the battery chargers 20, 21. It should be noted that data may be exchanged between the battery chargers 20, 21 via a communication bus 25 (or wirelessly).

Embodiments are contemplated where one or more of the battery chargers are adapted to charge a plurality of batteries. In the example embodiment that is illustrated in FIG. 2, battery charger 21 is adapted to charge a plurality of batteries 32B, 32C.

Figure 3:
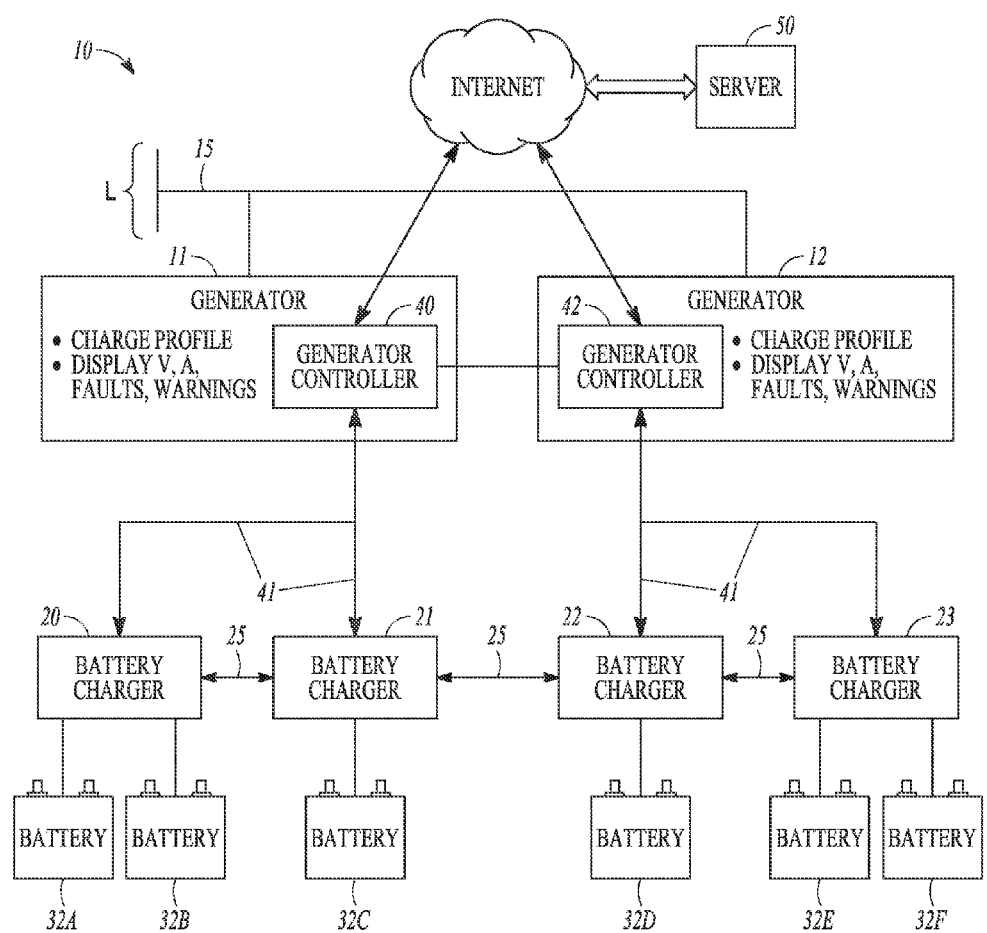
FIG. 3 is a functional block diagram similar to FIG. 1 where the power management system includes a plurality of generator controllers such that each generator controller is able to adjust operating conditions of one or more battery chargers.

FIG. 3 shows an example embodiment of the power management system 10 where the power management system 10 includes a plurality of generators 11, 12 that each provide a voltage output to the bus 15 where the bus is adapted to be connected to the load L. In the example embodiment that is shown in FIG. 3, the power management system 10 further includes a plurality of battery chargers 20, 21, 22, 23 that are adapted to charge a plurality of batteries 32A, 32B, 32C, 32D, 32E, 32F. It should be noted that while the generators 11, 12 are shown as providing power to the load L in parallel, the generators 11, 12 may not necessarily be hooked up in parallel.

The power management system 10 further includes a plurality of generator controllers 40, 42 that each operates one of the respective generators 11, 12. In addition, each of the generator controllers 40, 42 adjusts operating conditions of one or more corresponding battery chargers 20, 21, 22, 23 that are connected to the respective generator controllers 40, 42.

In the example embodiment that is illustrated in FIG. 3, generator controller 40 operates battery chargers 20, 21 and generator controller 42 operates battery chargers 22, 23. It should be noted that although only two battery chargers are shown per generator controller 40, 42, any number of battery chargers may be included for each generator controller in the power management system 10.

As shown in FIG. 3, the server 50 may be connected to at least some of the generator controllers 40, 42 such that the server 50 collects data related to each of the corresponding battery chargers 20, 21, 22, 23 that are associated with the respective generator controllers 40, 42. In some embodiments, the server 50 may collect data related to one, some or each of the corresponding batteries 32A, 32B, 32C, 32D, 32E, 32F that are associated with the respective battery chargers 20, 21, 22, 23.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system comprising:
    a secondary power source that includes a generator, wherein the generator includes an internal combustion engine and an alternator that provides a voltage output to a bus, wherein the bus is adapted to be connected to a load and to a primary power source such that secondary power source provides power to the load when the primary power source becomes unavailable;
    a battery charger that is adapted to charge a battery, wherein the battery charger is part of a plurality of battery chargers such that the generator controller adjusts operating conditions of at least one of the battery chargers; and
    a generator controller that operates the generator, wherein the generator controller adjusts operating conditions of the battery charger, wherein each battery charger exchanges data with the other battery chargers in the plurality of battery chargers in order to adjust operating conditions of at least one of the battery chargers.

2. The power management system of claim 1, wherein the primary power source is utility power.

3. The power management system of claim 1, wherein the generator controller displays information relating to a charge level of the battery.

4. The power management system of claim 1, wherein the generator controller displays information relating to operating parameters of the battery charger.

5. The power management system of claim 1, wherein the battery charger and generator controller are located within the same enclosure.

6. The power management system of claim 1, wherein the battery charger and generator controller exchange data via a communication bus that is connected to the generator controller and the battery charger.

7. The power management system of claim 1, further comprising a server that is connected to the generator controller over the network, wherein the server stores information relating to the charge level of the energy storage device and the operation of the power management system.

8. The power management system of claim 1, further comprising a server that is connected to the generator controller over the network, wherein the server stores information relating to charge profiles that may be utilized by the battery charger.

9. The power management system of claim 8, wherein the server provides commands to the generator controller as to how to adjust the charging profile of the battery charger.

10. The power management system of claim 8, wherein the generator controller adjusts the charging profile in order to increase energy efficiency associated with operating the battery charger when the battery charger receives power from a primary power source.

11. The power management system of claim 10, wherein the generator controller adjusts the charging profile by turning off the battery charger to increase energy efficiency associated with operating the battery charger when the battery charger receives power from a primary power source.

12. The power management system of claim 1, wherein the battery charger is adapted to charge a plurality of batteries.

13. The power management system of claim 1, wherein the battery charger is part of a plurality of battery chargers such that the generator controller adjusts operating conditions of at least one of the battery chargers, and wherein each battery charger is adapted to charge a plurality of batteries.

14. A power management system comprising:
a plurality of secondary power sources that each include a generator such that each generator includes an internal combustion engine and an alternator that provides a voltage output to a bus, wherein the bus is adapted to be connected to a load and to a primary power source such that at least one secondary power source provides power to the load when the primary power source becomes unavailable;
a plurality of battery chargers that is adapted to charge a plurality of batteries; and
a plurality of generator controllers that each operate one of the respective generators, wherein each of the generator controllers adjusts operating conditions of a corresponding battery charger that is connected to the respective generator controller; and
a server that is connected to at least some of the generator controllers such that the server collects data related to each of the corresponding battery chargers that are associated with the respective generator controllers, wherein each battery charger exchanges data with the other battery chargers in the plurality of battery chargers in order to adjust operating conditions of at least one of the battery chargers.

15. The power management system of claim 14, wherein the server collects data related to each of the corresponding batteries that are associated with the respective battery chargers.

16. A power management system comprising:
a secondary power source that includes a generator, wherein the generator includes an internal combustion engine and an alternator that provides a voltage output to a bus, wherein the bus is adapted to be connected to a load and to a primary power source such that secondary power source provides power to the load when the primary power source becomes unavailable;
a battery charger that is adapted to charge a battery;
a generator controller that operates the generator, wherein the generator controller stores a variety of different charging profiles for different types of batteries, wherein the generator controller determines the type of battery and adjusts operating conditions of the battery charger based on the type of battery; and
a server that is connected to the generator controller over the network, wherein the server stores information relating to charge profiles that is utilized by the battery charger for different types of batteries.

17. The power management system of claim 16, wherein the server provides commands to the generator controller as to how to adjust the charging profile of the battery charger based on the type of battery.

* * * * *